Patented Mar. 11, 1941

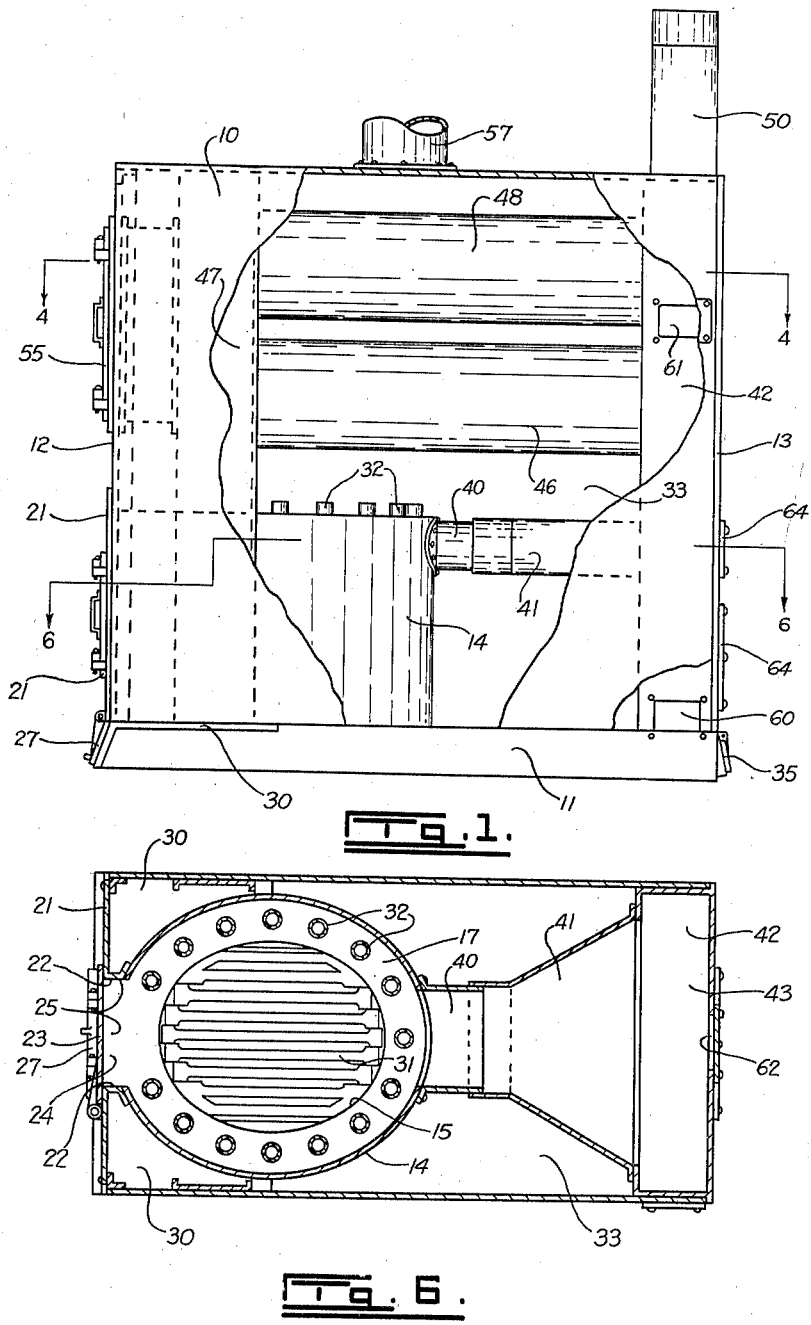

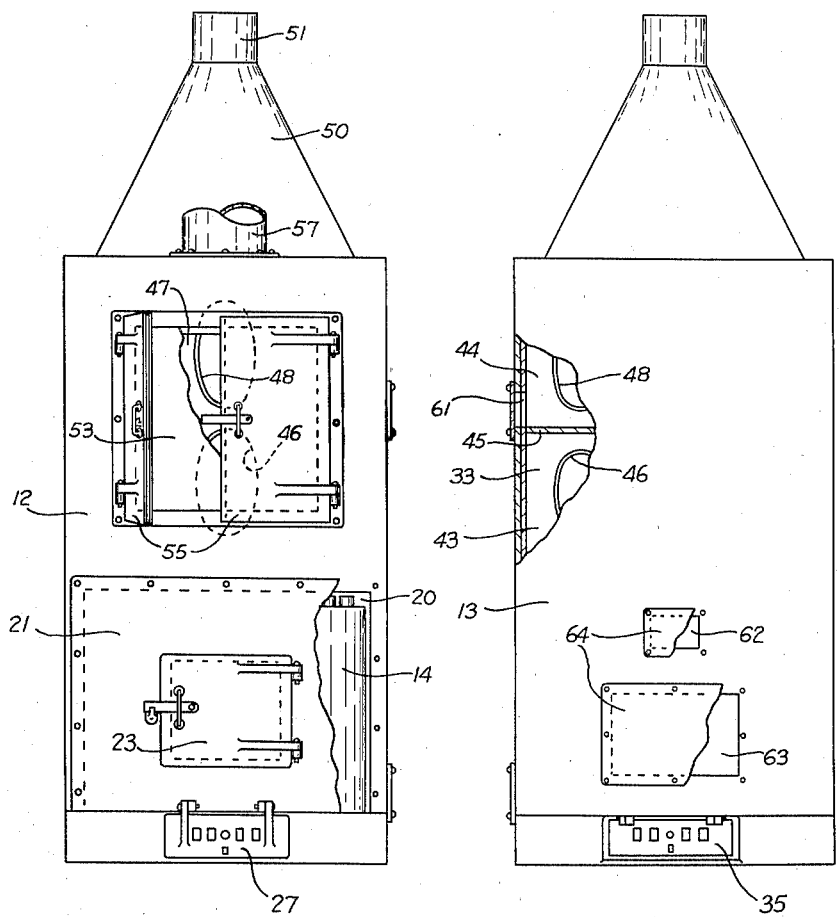

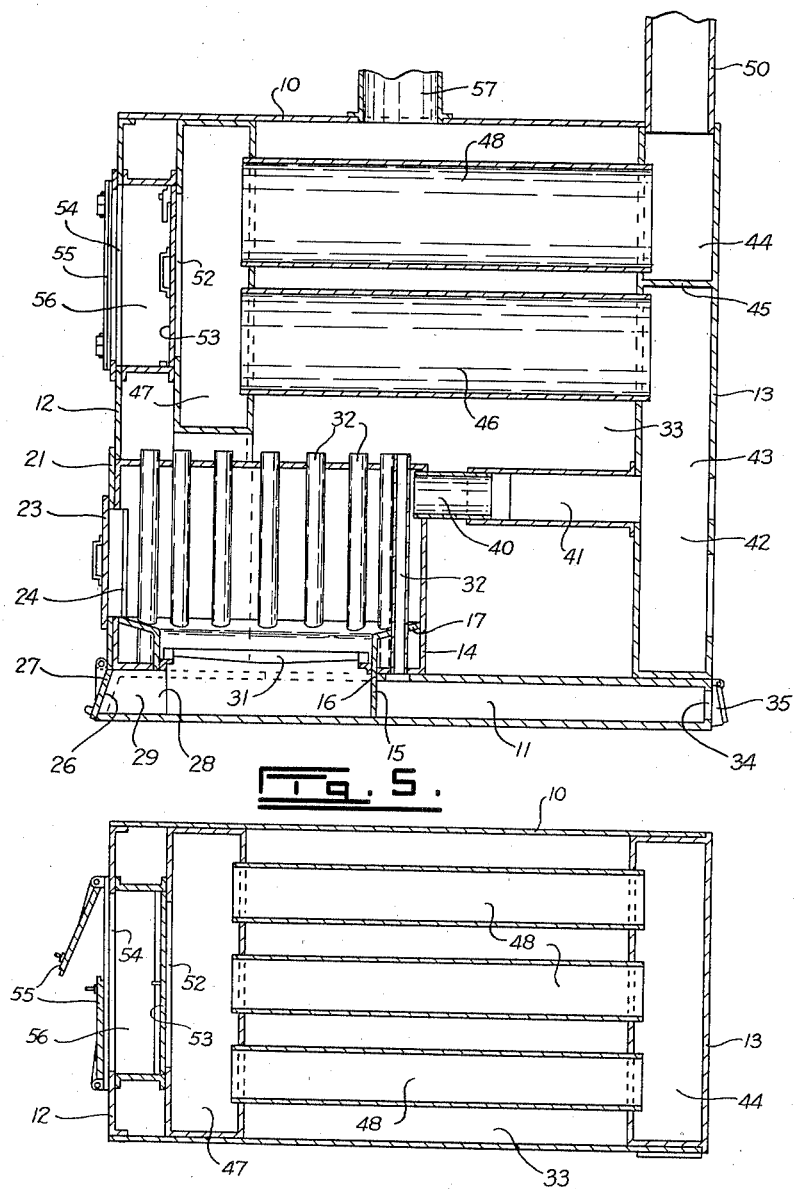

2,234,628

UNITED STATES PATENT OFFICE 2,234,628

HEATING DEVICE

Morton Lincoln Dunham, Vancouver, British Columbia, Canada

Application April 3, 1939, Serial No. 265,853

2 Claims. (Cl. 126—109)

This invention relates to an improved heating device, such as a furnace or the like.

An object of the present invention is the provision of a heating device having a large heat exchanging surface in a comparatively small space.

Another object is the provision of a heating device in which the hot exhaust gases always move in a natural direction, that is either horizontally or vertically.

Another object is the provision of a heating device having a primary heating chamber in which the air or other heat conveying medium is brought into close contact with the fire or other source of heat, and a secondary heating chamber in which the preheated air or other heat conveying medium is brought into intimate contact with the exhaust gases for a relatively long period of time to remove the greater part of the heat therefrom.

A further object is the provision of a heating device which may be very easily cleaned out.

A still further object is the provision of a heating device occupying comparatively little space, which device is adapted to give off a relatively great amount of heat.

As is well known, there are numerous heating devices in use and on the market. Many of these devices do not give off sufficient heat for the purpose for which they were installed while practically all of them use considerably more fuel than is actually necessary. The reason for this is that only a comparatively small amount of the heat generated is drawn off, the remainder of the heat passing out through the flue. Many attempts have been made to increase the heat exchanging surfaces in heating devices but this usually results in the necessity of increasing the size of the device, thus increasing the cost of production and requiring more space for installation.

This invention overcomes these difficulties by providing a heating device having an increased heat exchanging surface without materially increasing the size of the whole device. This is obtained by passing the heat conveying medium through a primary heating chamber in which the fire or other source of heat is situated and then passing the medium through a secondary heating chamber in which a plurality of relatively large heat exchanging surfaces are located, said surfaces being heated by the hot exhaust gases from the primary chamber.

The present invention consists essentially of a heating device comprising a primary heating chamber in which the source of heat is situated, means for directing the heat conveying medium through the primary chamber, a secondary heating chamber adapted to receive the medium from the primary chamber, and means for conducting the hot exhaust gases from the primary chamber through the secondary chamber, whereby a substantial portion of the heat from the exhaust gases is transferred to the heat conveying medium as more fully described in the following specification and illustrated in the accompanying drawings, in which—

Figure 1 is a side elevation of the heating device with the casing partly broken away to show the interior thereof, Figure 2 is a front end elevation of the heating device, with part of the casing broken away, Figure 3 is a rear end elevation with part of the casing broken away, Figure 4 is a horizontal sectional view taken on the line 4—4 of Figure 1, Figure 5 is a vertical sectional view taken longitudinally and centrally of the heating device, and Figure 6 is a horizontal sectional view taken substantially on the line 6—6 of Figure 1.

Referring more particularly to the drawings, 10 is a casing, preferably rectangular in shape, mounted upon a hollow base 11 and having front and rear walls 12 and 13, respectively. A casing forming a combustion or primary heating chamber 14 is mounted in the casing 10 adjacent the forward end thereof. This chamber may be of any desired shape but it is preferably in the form of a cylinder or cylindroid. The main portion of the chamber 14 is seated upon the top of the base 11 while a sleeve 15 of similar shape but of a lesser diameter than the chamber, extends downwardly through an opening 16 in the top of the base 11 to the bottom thereof. The sleeve 15 is formed at its top with a flange 17 which extends upwardly and outwardly to the wall of the chamber 14 forming a downwardly sloping ledge in said chamber spaced from the bottom thereof.

A relatively large opening 20 is formed in the wall 12 at the bottom thereof, which opening is closed by a removable cover 21 having a central opening 22 closed by a hinged door 23. A corresponding opening 24 is formed in the combustion chamber 14 above the ledge 17, which opening is connected to the opening 20 by a passage 25. Similarly, an opening 26 is formed in the front end wall of the base 11, which opening is closed by a damper door 27. A corresponding opening 28 is formed in the sleeve 15 below the top of the base 11 and said opening is connected to the opening 26 by a passage 29. The combustion chamber 14 may be taken out of the device by removing the cover 21 and a removable section 30 of the base 11.

A grate 31 is mounted in the sleeve 15 of the primary chamber 14 slightly below the flange 17 so that said sleeve forms a fire pot above and an ash pit below the grates. A plurality of spaced-apart tubes 32 extend through the top of the base 11, the flange and the top of the chamber 14. These tubes almost surrounding the primary chamber 14 adjacent the periphery thereof, are preferable in a vertical position and communicate at one end with the interior of the casing 10, hereinafter referred to as the secondary heating chamber 33, and at the other end with the interior of the base 11 which, in turn, communicates with the atmosphere outside the device through an opening 34 formed in the rearward end wall of said base, which opening may have a hinged door 35. In this way, a plurality of passages extending through the primary heating chamber, communicate with the atmosphere outside the device at one end and at the other end with the secondary heating chamber 33. If desired, the tubes 32 could terminate above the top of the base 11, in which case it would be necessary to form one or more openings in the wall of the chamber 14 between the base 11 and the ledge 17 and to place the opening 34 in the rear end wall 13 of the casing above said base.

A pipe 40 extends outwardly from the chamber 14 and slidably fits into a pipe 41 which flares outwardly in a horizontal plane and is connected at its large end to a rear distributing chamber 42 located within the secondary chamber. The distributing chamber 42 is divided into lower and upper sections 43 and 44, respectively, by a partition 45. A plurality of comparatively large horizontal pipes 46 extend from the upper end of the lower distributing chamber 43 to the lower end of a forward distributing chamber 47 which is situated above the primary chamber 14 and preferably spaced inwardly from the front wall 12 of the casing 10. Similarly, a plurality of comparatively large pipes 48 extend from the upper end of the distributing chamber 47 to the upper distributing chamber 44. A tapered pipe 50 communicates with the upper distributing chamber, said pipe being substantially the same width as the chamber at its lower end and tapering upwardly to an ordinary pipe 51, which is connected to a flue, not shown.

A relatively large opening 52 is formed in the front wall of the distributing chamber 47 and a door 53 removably closes said opening. A corresponding opening 54 is formed in the front wall 12 of the casing, which opening is closed by one or more doors 55 and is connected to the opening 52 by a passage 56.

A pipe 57 extends outwardly from the casing 10 and is connected to the rooms to be heated by the heating device. Clean-out openings 60 and 61 are formed in the casing 10 at the sides of the lower and upper distributing chambers 43 and 44 adjacent the bottom of each chamber and a clean-out opening 62 is formed in the rear wall 13 in line with the pipes 40 and 41. A comparatively large opening 63 may be formed in the rear wall 13, said opening communicating with the lower distributing chamber 43. This latter opening is provided in order that, if desired, when relatively little heat is required, a sawdust burner may be mounted on the device and used in place of having a fire in the combustion chamber 14. Each of the openings 60, 61, 62 and 63 is provided with a removable cover 64.

In use, fuel is supplied to a fire on the grate 31 through the opening 22 and ashes are removed from beneath the grate through the opening 26. The hot exhaust gases from the fire pass from the combustion chamber 14 through a tortuous passage consisting of the pipes 40 and 41, the lower distributing chamber 43, the pipes 46, the forward distributing chamber 47, the pipes 48, and the upper distributing chamber 44 whence they are discharged from the heating device through the pipe 50. Air entering the device through the opening 34 moves along the base 11 and upwardly through the tubes 32 into the secondary heating chamber 33. The air is warmed or preheated as it passes through the base 11 by heat from the secondary heating chamber and it is brought into close contact with the fire in the primary heating chamber as it passes through the tubes. The walls of the pipes 40, 41, 46 and 48 along with those of the distributing chambers 43, 47 and 44 act as heat exchanging surfaces which transfer heat from the exhaust gases to the air in the secondary chamber, which rises and passes out through the pipe 57. In this way, the greater part of the heat is removed from the exhaust gases before they leave the device owing to the comparatively large area of the heat exchanging surface. The distributing chamber 47 and the pipes 46 and 48 may be cleaned through the openings 52 and 54, the distributing chambers 43 and 44 through the openings 60 and 61, and the pipes 40 and 41 through the opening 62. The exhaust gases rise naturally in the primary heating chamber, in each of the distributing chambers and in the pipe 50 while they move horizontally through the pipes 40, 41, 46 and 48. The pipe 41 permits the gases to spread across the full width of the lower rearward distributing chamber while the plurality of pipes 46 and 48 provide ample passageway for the gases to and from the forward distributing chamber, and said gases are gathered up by the lower end of the pipe 50 to be directed to the flue. Thus the pipe 41 ensures an even distribution of the exhaust gases laterally of the heating device and, consequently, an even distribution of the heat to the heat conveying medium.

While combustion chamber 14 has been described as having a grate for coal or wood fire, it will be understood that it may be fitted with suitable means for burning any type of fuel, such as, for example, oil or gas.

It is possible to omit the tubes 32 and still obtain very good results from this heating device but it is preferable to retain these tubes in order to obtain the best results.

As mentioned before, the combustion chamber 14 may be removed from the device. This may be for cleaning or repairing or the chamber may be used by itself as a heating device. In the latter case, it would be necessary to provide the chamber with a suitable base and with doors the proper size for the openings 24 and 28 while the pipe 40 would be connected to a flue. When used alone, air would circulate up through the tubes 32 where it is brought into close contact with the fire while heat is simultaneously given off from the device from the outside in the usual manner.

If desired, each of the tubes 37 may be connected to a water system whereby water would be heated therein.

From the above it will readily be seen that an improved heating device has been provided having a large heat exchange surface in a comparatively small space, which device may be easily cleaned, and in which the exhaust gases always move in a natural direction.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim as my invention is:

1. A heating device comprising a hollow base, a casing mounted on the base forming a secondary heating chamber, a casing forming a relatively small primary heating chamber mounted on the base within the secondary chamber, a sleeve forming a fire pot and ash pit extending downwardly from the primary chamber through an opening in the top of the base to the bottom thereof, said sleeve and the casing having corresponding openings connected by a passage, a damper door closing said passage, a plurality of vertical tubes extending through the primary chamber and communicating with the secondary chamber at one end and with the interior of the base at the other end, said base having an opening in a wall thereof through which air may enter therein, and a tortuous passage in the secondary chamber for conducting therethrough the hot exhaust gases from the primary chamber, whereby air preheated in the base passes through the tubes into the secondary chamber to receive a substantial portion of the heat generated in the device.

2. A heating device comprising a hollow base, a casing mounted on the base forming a secondary heating chamber, a casing forming a relatively small primary heating chamber removably mounted on the base within the secondary chamber, a sleeve forming a fire pot and ash pit extending downwardly from the primary chamber through an opening in the top of the base to the bottom thereof, said sleeve and the casing having corresponding openings connected by a passage, a damper door closing said passage, said casing having a relatively large opening in a wall thereof through which the primary chamber may be removed, a cover removably secured to the casing over said opening, means for directing air through the base and the primary heating chamber into the secondary chamber, and a tortuous passage formed in the secondary chamber for conducting therethrough the hot gases from the primary chamber, whereby a substantial portion of the heat generated is transferred to the air.

MORTON LINCOLN DUNHAM.